United States Patent [19]

Holt et al.

[11] Patent Number: 5,486,373

[45] Date of Patent: Jan. 23, 1996

[54] FROZEN CONFECTION

[75] Inventors: Christopher B. Holt, Bedford; Julia H. Telford, Thrapston, both of United Kingdom

[73] Assignee: Good Humor Corporation, Green Bay, Wis.

[21] Appl. No.: 424,766

[22] Filed: Apr. 19, 1995

Related U.S. Application Data

[63] Continuation of Ser. No. 282,102, Jul. 28, 1994, abandoned, which is a continuation of Ser. No. 51,493, Apr. 22, 1993, abandoned.

[30] Foreign Application Priority Data

Apr. 24, 1992 [EP] European Pat. Off. ............ 92303684.2

[51] Int. Cl.$^6$ ...................................................... A23G 9/00
[52] U.S. Cl. ............................................................. 426/565
[58] Field of Search .................................. 426/565, 566, 426/567, 100, 101, 249, 660

[56] References Cited

U.S. PATENT DOCUMENTS

| 2,002,363 | 5/1935 | Schade ..................................... 426/565 |
| 2,550,656 | 4/1951 | Knechtges ............................... 426/565 |
| 3,792,182 | 2/1974 | Carpigiani et al. ..................... 426/566 |
| 3,968,266 | 7/1976 | Baugher ................................... 426/566 |
| 4,219,581 | 8/1980 | Dea et al. ................................ 426/565 |
| 4,582,712 | 4/1986 | Gonsalves et al. ...................... 426/134 |
| 4,832,976 | 5/1989 | Griffin et al. ........................... 426/660 |
| 5,082,582 | 1/1992 | Peterson .................................. 426/566 |

FOREIGN PATENT DOCUMENTS

| 26792/88 | 12/1987 | Australia . |
| 0322469 | 7/1989 | European Pat. Off. . |
| 1418082 | 10/1965 | France . |
| 1692383 | 11/1967 | Germany . |
| 9112890 | 12/1991 | Germany . |
| 54026363 | 2/1979 | Japan . |
| 57-155593 | 12/1982 | Japan . |
| 4004846 | 1/1992 | Japan . |

OTHER PUBLICATIONS

EP Search Report EP 92 30 3683.
WO 90/11481 PCT Application.
EP Search Report EP 92 30 3684.
EP 92 30 3685 EP 92 30 3685.

*Primary Examiner*—Jeanette Hunter
*Attorney, Agent, or Firm*—James J. Farrell

[57] ABSTRACT

Frozen low bulk density dessert or confection products, such as ice confections, having a thermal transition temperature in excess of −18° C. and in particular in excess of −13° C. to prevent or reduce unintended shrinkage and deformation.

4 Claims, No Drawings

FROZEN CONFECTION

This is a continuation application of Ser. No. 08/282,102, filed Jul. 28, 1994; which is a continuation of Ser. No. 08/051,493, filed Apr. 22, 1993, both of which are now abandoned.

Frozen gas-containing dessert products or confections are well-known. Usually the gas-content, expressed as percentage overrun, varies from 10 to 30% for sherbets to 60 to 100% for ice cream corresponding with bulk density ranges of from 0.77 to 0.9 g/ml and of from 0.5 to 0.63 g/ml respectively.

Attempts to increase the overrun for obtaining warmer eating products or other special effects were not without result but inevitably resulted in unacceptable shrinkage or deformations when storing those products. This could only be partly remedied by using larger amounts of additives such as stabilizers, the level of which from a consumer point of view should however be kept as low as possible.

It is an object of the invention to provide a frozen high-overrun dessert or confection of low bulk density devoid of these shrinkage and deformation problems. The expression "low-bulk density products" in the present specification and claims is defined as a product having a bulk density below 0.45 g/ml and down to 0.09 g/ml and in particular below 0.33 g/ml, in practice say down to 0.17 g/ml. A reguirement of this product being that it can be stored in a usual manner, such as by keeping it in a cold store of $-25°$ C. to $-40°$ C. in a freezing cabinet of about 18° C. and below, or in a display cabinet where the temperature may be some degrees higher than this, keeping in mind that in commercial freezing cabinets temperature fluctuations of several degrees centigrade are not unusual.

A further object of the invention is to provide frozen dessert products having a new structure and texture. The invention provides thereto frozen low bulk density desserts or confections, having a thermal transition temperature in excess of $-18°$ C. and in particular in excess of $-13°$ C. This transition is sometimes referred to as the glass transition temperature (Tg) and will be described later. In practice, the thermal transition temperature of frozen dessert material according to the invention will normally be below $-2°$ C. and more usually below $-6°$ C. and in particular below $-8°$ C.

Frozen gas-containing desserts having such a relatively high thermal transition temperature can be aerated to a much lower bulk density than usual without the expected risk of high shrinkage which will be experienced with highly aerated frozen dessert products of usual composition, i.e., without excessive amounts of additives. That is, the water solidifies as an amorphous solid having negligible diffusion and thus relatively very stable.

Determination of the thermal transition temperature is carried out by differential scanning calorimetry. About 10 mg of solution is sealed in a pan. An empty pan is used as a reference and the pans are crash-cooled and then warmed again at a rate of 5° C. per minute. The thermal transition temperature is seen as a change in the heat capacity before the ice melting curve. This change may be a step or a peak. There may be other small changes prior to this but the thermal transition is defined as the last change before the ice melting/dissolving curve.

Controlling the thermal transition temperature of frozen desserts can be easily effected by every skilled person in the ice-cream and frozen dessert business by controlling the number-average molecular weight of the ingredients of these desserts. Raising the thermal transition temperature of a product may be affected by reducing the content of low molecular weight ingredients and replacing it with high molecular weight ingredients. In practice for example sucrose may be replaced by any of low DE maltodextrins, modified starches, proteins, polysaccharides, mixtures thereof etcetera. Also the level of lactose may be reduced. If milk solids are to be used these are preferably low in or free of lactose.

The invention also provides a frozen gas-containing dessert product having a bulk density between about 0.45 and 0.09 g/ml and having thermal transition temperature properties as defined above. In a preferred embodiment the bulk density of this product is below 0.33 g/ml providing a light and not too cold eating product e.g. suitable for little children.

The invention will be exemplified in the following examples:

EXAMPLE 1

Two products A, B according to the invention and a control C were prepared in a usual manner: the ice mixes were made up, pasteurized and frozen while aerating in a scraped surface heat exchanger using ammonia as a coolant. After aerating to the overrun as indicated and freezing to a suitable temperature between $-1°$ and $-5°$ C. to obtain a degree of solidity suitable for shaping the products were shaped into lollipops and frozen hard to below $-30°$ C.

The thermal transition temperature was determined as described before and the shrinkage is defined as the percentage volume loss after 2 weeks storage on the top layer of an open topped display cabinet, i.e. just below the load line of said cabinet.

| Compositions (%) | A | B | C |
| --- | --- | --- | --- |
| 6 DE maltodextrin | 20 | 33.14 | — |
| Locust bean gum | 0.2 | 0.1 | 0.2 |
| Carrageenan | 0.02 | 0.01 | 0.02 |
| Skim milk powder | 5.0 | 4.141 | 10.0 |
| D100 (whipping aid) | 0.2 | 0.5 | — |
| gelatine | — | 0.5 | — |
| sucrose | — | — | 11.0 |
| 63 DE corn solids | — | — | 6.0 |
| Coconut Fat | — | — | 3.5 |
| Glycerol monostearate | — | — | 0.45 |
| water up to 100% | | | |
| transition temperature | $-12.5°$ C. | $-10.4°$ C. | $-31.9°$ C. |
| overrun | 190% | 181% | 182% |
| bulk density (g/ml) | 0.38 | 0.39 | 0.39 |
| shrinkage | 3.8 ± 1.8 | 2.3 ± 1.8 | 10.9 ± 6.3 |

The products according to the invention A and B could withstand the temperature abuse at the load line of the cabinet without showing any significant shrinkage. This abuse means that the top surface of the product is at a temperature of about $-14°$ C. while the bottom is at about $-17°$ C., i.e. a temperature gradient across the product of about 3° C.

Other ways in which the mix can be processed includes aeration and freezing as two consecutive processing steps, wherein freezing may be executed after filling the aerated mix into suitable moulds such as lollipop moulds, or extruding the partly frozen mix into a log and cutting slices of it. This cutting may proceed as usual i.e. while supported on a belt or right after downwardly extruding through a suitable nozzle and, while the log is hanging downwardly from the nozzle, cutting slices off said log which slices are allowed to drop on a conveyor. Another way in which the mix can be processed is by extruding fine rods (the rods themselves may be aerated). The rods may be parallel or tangled like candy floss. If desired the products may be provided with a stick, as it usual for many ice confection products, before the product is frozen hard.

EXAMPLE 2

As a further example of a suitable ice mix for an ice confection product according to the invention the following formulation may be given:

| | |
|---|---|
| 20% | 2 DE corn solids |
| 2% | milk protein |
| 3.5% | coconut fat |
| 0.07% | aspartame |
| 0.45% | GMS (emulsifier) |
| | water up to 100% |

This mix could be whipped and frozen to an overrun of about 500% resulting in a bulk density of about 0.17 g/ml. The thermal transition temperature was determined at −9° C.

Storage at the load line of a commercial open topped freezer cabinet did not result in any appreciable shrinkage after 14 days.

EXAMPLE 3

A still further example is as follows:

| | |
|---|---|
| 20% | 2 DE maltodextrin |
| 0.1% | citric acid |
| 0.1% | fruit flavour |
| 0.1% | colour |
| 0.3% | D 100 (whipping aid) |
| | water up to 100% |

This mixture is aerated in an in-line mixer to an overrun of 1000% (bulk density 0.1 g/ml). It is extruded onto a conveyor belt and cut into sections. Thereafter ice lolly sticks are inserted into the sections when still soft. The products are then frozen in a hardening tunnel. This product also has a thermal transition temperature of −9° C. and does not show any appreciable shrinkage on storage for 2 weeks in an open freezer cabinet at −15° to −18° C.

We claim:

1. Frozen gas-containing dessert or confection product comprising a thermal transition temperature in excess of −18° C. and particularly in excess of −13° C., and a bulk density below 0.45 g/ml down to 0.09 g/ml.

2. Product according to claim 1, comprising a thermal transition temperature below −2° C. and particularly below −8° C.

3. Product according to claim 1, having bulk density down to 0.33 g/ml.

4. Product according to claim 1, having a bulk density down to 0.17 g/ml.

* * * * *